US012789992B2

(12) United States Patent
Suzuki

(10) Patent No.: US 12,789,992 B2
(45) Date of Patent: Nov. 10, 2026

(54) FLYING BODY AND METHOD FOR TRANSPORTING LOAD USING SAME

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 17/794,556

(22) PCT Filed: Jun. 8, 2020

(86) PCT No.: PCT/JP2020/022595
§ 371 (c)(1),
(2) Date: Jul. 21, 2022

(87) PCT Pub. No.: WO2021/250763
PCT Pub. Date: Dec. 16, 2021

(65) Prior Publication Data
US 2023/0069643 A1 Mar. 2, 2023

(51) Int. Cl.

| | |
|---|---|
| ***B64D 1/10*** | (2006.01) |
| ***B64D 1/22*** | (2006.01) |
| ***B64U 101/64*** | (2023.01) |
| *B64U 10/13* | (2023.01) |
| *B64U 30/20* | (2023.01) |
| *B64U 30/21* | (2023.01) |
| *B64U 50/19* | (2023.01) |

(52) U.S. Cl.
CPC ................ *B64D 1/10* (2013.01); *B64D 1/22* (2013.01); *B64U 10/13* (2023.01); *B64U 30/20* (2023.01); *B64U 30/21* (2023.01); *B64U 50/19* (2023.01); *B64U 2101/64* (2023.01); *B64U 2201/10* (2023.01)

(58) Field of Classification Search
CPC ............ B64U 2101/60; B64U 2101/64; B64U 2101/66; B64D 1/00; B64D 1/02; B64D 1/10; B64D 1/12
See application file for complete search history.

(56) References Cited

U.S. PATENT DOCUMENTS

| | | | | |
|---|---|---|---|---|
| 10,249,200 | B1 * | 4/2019 | Grenier | G08G 5/0069 |
| 10,377,455 | B2 * | 8/2019 | Oh | B64D 1/12 |
| 10,377,489 | B2 * | 8/2019 | Sawhney | B64D 1/10 |
| 11,174,848 | B1 * | 11/2021 | Rutland | B64C 25/20 |
| 11,186,368 | B2 * | 11/2021 | Prager | B64U 10/14 |

(Continued)

FOREIGN PATENT DOCUMENTS

| | | | | |
|---|---|---|---|---|
| CN | 107745807 A | | 3/2018 | |
| CN | 109435603 A | * | 3/2019 | B60F 5/02 |

(Continued)

OTHER PUBLICATIONS

Notice of reasons for refusal dated Dec. 17, 2020 issued for Japanese Patent Application No. 2020-559008.

(Continued)

*Primary Examiner* — Richard Green
(74) *Attorney, Agent, or Firm* — HAUPTMAN HAM, LLP

(57) ABSTRACT

A flying body including a mounting space for mounting an object, a loading port for loading the object in the mounting space, and a take-out port for taking out the object loaded in the mounting space, wherein the loading port and the take-out port are provided at least partially at different positions.

1 Claim, 26 Drawing Sheets

(56) References Cited

U.S. PATENT DOCUMENTS

| | | | | |
|---|---|---|---|---|
| 11,643,203 | B2 * | 5/2023 | Lee | B64D 1/10 |
| | | | | 244/17.23 |
| 12,106,256 | B2 * | 10/2024 | Lee | B64D 1/22 |
| 2014/0180914 | A1 * | 6/2014 | Abhyanker | G06Q 10/0832 |
| | | | | 705/332 |
| 2017/0316701 | A1 * | 11/2017 | Gil | B64U 10/16 |
| 2018/0148168 | A1 * | 5/2018 | Newman | B64C 27/50 |
| 2018/0196445 | A1 | 7/2018 | Bokeno | |
| 2018/0229843 | A1 | 8/2018 | Costanzo | |
| 2019/0116719 | A1 | 4/2019 | Fletcher | |
| 2019/0161190 | A1 * | 5/2019 | Gil | B64U 10/16 |
| 2019/0193855 | A1 * | 6/2019 | Prager | B64D 1/10 |
| 2020/0175468 | A1 * | 6/2020 | Tsuruta | G06Q 10/0832 |
| 2021/0214075 | A1 * | 7/2021 | Yamato | B64U 10/14 |
| 2021/0221499 | A1 * | 7/2021 | Lee | B64D 1/14 |
| 2021/0269140 | A1 * | 9/2021 | Han | B64C 39/024 |
| 2021/0380243 | A1 * | 12/2021 | Ratajczak | B64D 1/22 |
| 2022/0048625 | A1 * | 2/2022 | Prager | B64U 10/14 |
| 2023/0015158 | A1 * | 1/2023 | Evans | B64U 50/39 |

FOREIGN PATENT DOCUMENTS

| | | | |
|---|---|---|---|
| JP | 2016088675 | A | 5/2016 |
| JP | 2018193061 | A | 12/2018 |
| JP | 2019-001397 | A | 1/2019 |
| JP | 2019004882 | A | 1/2019 |
| JP | 2020-083600 | A | 6/2020 |
| KR | 10-2100437 | B1 | 5/2020 |
| WO | 2017216972 | A1 | 12/2017 |
| WO | 2018035578 | A1 | 3/2018 |

OTHER PUBLICATIONS

Notice of reasons for refusal dated Oct. 21, 2021 issued for Japanese Patent Application No. 2021-164991.

Notice of reasons for refusal dated Feb. 3, 2022 issued for Japanese Patent Application No. 2021-164991.

Rejection assessment dated Dec. 2, 2021 issued for Japanese Patent Application No. 2021-164991.

The Extended European Search Report dated Jan. 4, 2024 for European Patent Application No. 20940230.4.

Notice of Reasons for Refusal dated Aug. 1, 2024 for Japanese Patent Application No. 2023-179958.

Office Action in CN application No. 202080099313.0, dated Feb. 25, 2025, 14pp.

Office Action in JP application No. 2023-179958, mailed Dec. 19, 2024, 4pp.

Office Action in JP application No. 2025-044041, dated Jun. 18, 2026, 6pp.

* cited by examiner

FLYING BODY AND METHOD FOR TRANSPORTING LOAD USING SAME

TECHNICAL FIELD

The present disclosure relates to a flying body, and more particularly, to a flying body equipped with a mechanism for carrying a load and a method of transporting a load.

BACKGROUND ART

In recent years, there have been attempts to deliver a load using a flying body such as a drone or unmanned aerial vehicle (UAV) (hereinafter simply referred to as a "flying body"), and actions toward practical use of delivery by unmanned aerial vehicles are underway. Patent Literature 1 discloses a flying body capable of delivering various articles such as food (hereinafter, "object"). (see, for example, Patent Literature 1).

In Patent Literature 1, an unmanned aerial vehicle equipped with a delivery unit for storing an object provides a delivery drone that can be used to deliver all types of items autonomously or partially autonomously (for example, see Patent Literature 1).

PRIOR ART LIST

Patent Literature

[Patent Literature 1] International Publication No. 2018/035578
[Patent Literature 2] U.S. Patent Application Publication No. 20180196445

SUMMARY OF THE INVENTION

Technical Problem

In Patent Literature 1, an object can be delivered to a remote address while monitoring information on an unmanned aerial vehicle equipped with a delivery unit that stores one or more objects, and the delivery unit has a deployable portion so that the receiving user can receive the object.

However, in the method of attaching a load from the lower side of an airframe, which is also used in Patent Literature 1, it is difficult to say that the method is simple when a sender attaches an object.

When it is actually operated by a retail store or a transport company and the delivery operation is performed, it is desirable that the method of mounting an object on an airframe is inexpensive and easy to operate by more people without requiring specialized knowledge.

In Patent Literature 2, a device for automatically loading a load has been developed as a method of simplifying the loading operation.

The loading device simply sets the object to be mounted on the airframe in a predetermined place so that the loading of objects on the airframe and the takeoff of the airframe are carried out on city roads. However, it is difficult to introduce such an automatic system into practice because the device is large and the introduction cost of the device itself is high.

Therefore, one purpose of the present disclosure is to provide a flying body that can easily load and unload an object and can be easily and safely operated even by a person without specialized knowledge.

Technical Solution

According to the present disclosure, there can be provided a flying body comprising: a mounting space for mounting an object, a loading port for loading the object in the mounting space, and a take-out port for taking out the object loaded in the mounting space, wherein the loading port and the take-out port are provided at least partially at different positions.

Advantageous Effects

According to the present disclosure, there can be provided a flying body that can be easily loaded and unloaded and can be operated easily and safely even by a person without specialized knowledge.

DETAILED DESCRIPTION OF THE EMBODIMENTS

The contents of the embodiment of the present disclosure will be listed and described. The embodiment of the present disclosure has the following configuration.

[Item 1]

A flying body comprising:

a mounting space for mounting an object;

a loading port for loading the object in the mounting space; and a take-out port for taking out the object loaded in the mounting space, wherein the loading port and the take-out port are provided at least partially at different positions.

[Item 2]

The flying body according to Item 1, wherein the loading port is provided above the mounting space, and the take-out port is provided below the mounting space.

[Item 3]

The flying body according to Item 1, wherein the loading port is provided on the side of the mounting space, and the take-out port is provided below the mounting space.

[Item 4]

The flying body as in any one of Items 1 to 3, wherein the take-out port has a discharge mechanism for discharging the object.

[Item 5]

The flying body as in any one of Items 1 to 4, wherein: the discharge mechanism communicates with a predetermined device at a landing point and receives a discharge execution signal to perform discharge.

DETAILS OF EMBODIMENTS ACCORDING TO THE PRESENT DISCLOSURE

Hereinafter, a flying body according to embodiments of the present disclosure will be described with reference to the accompanying drawings.

First Embodiment

Figure 1:
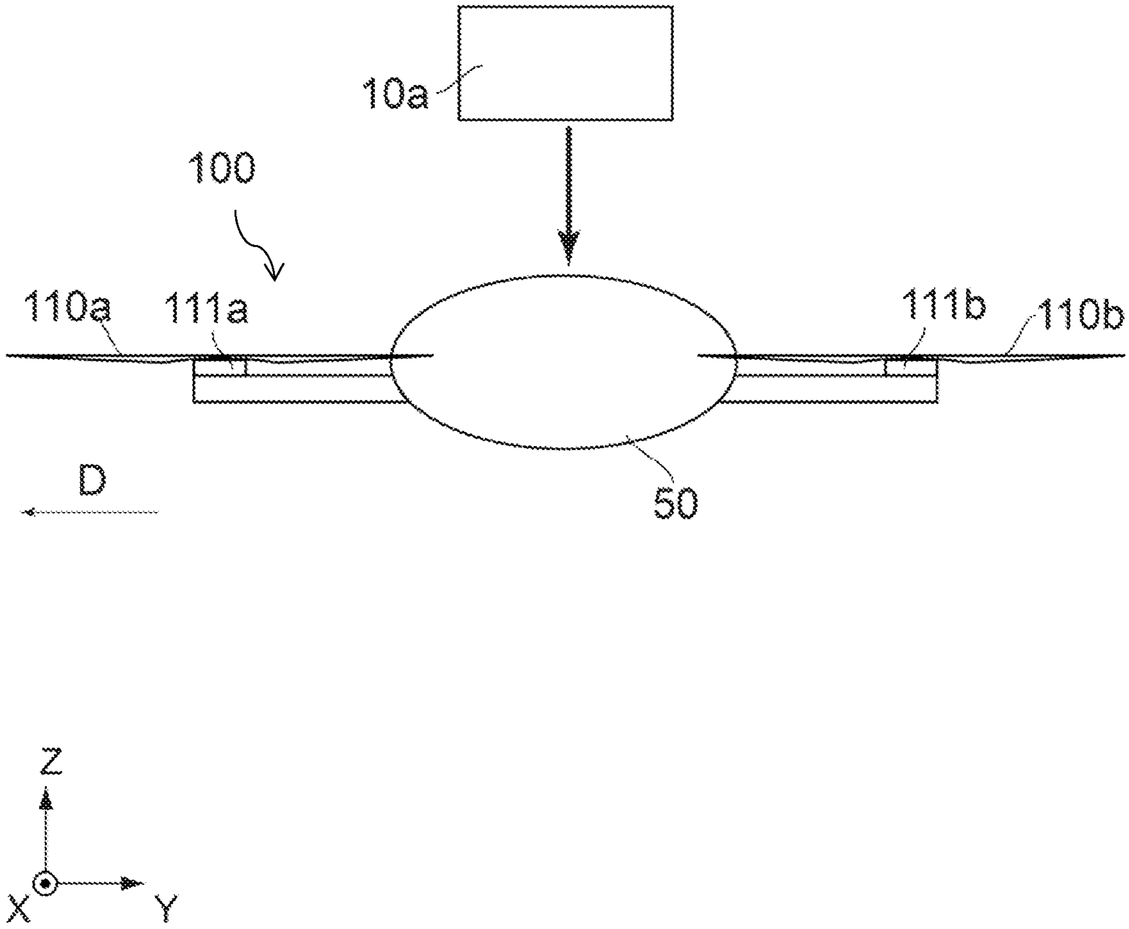
FIG. 1 is a conceptual diagram of an object loading/unloading method according to the present disclosure according to the present disclosure as viewed from the side.

As shown in FIG. 1, a flying body 100 according to embodiments of the present disclosure includes a mounting space 50 for mounting an object 10*a*. The mounting space 50 includes a loading port for loading the object 10*a* and a take-out port for taking out the object 10*a*, and the loading port and the take-out port are provided at least partially at different positions.

Further, it is desirable that the flying body 100 includes at least elements such as propellers 110*a* and 110*b* and motors 111*a* and 111*b* for flying and is mounted with energy to operate them (for example, secondary battery, fuel cell, fossil fuel, etc.).

Further, the flying body 100 shown in the figure is drawn in a simplified manner for facilitating the explanation of the structure of the present disclosure, and for example, the detailed configuration of a control unit and the like is not shown.

The flying body 100 and a moving body make the direction of the arrow D in the figure (−YX direction) as a traveling direction (details will be described later).

Further, in the following explanation, the terms may be selectively used according to the following definitions. Front-rear direction: +Y direction and −Y direction, up-down direction (or vertical direction): +Z direction and Z direction, left-right direction (or horizontal direction): +X direction and −X direction, travelling direction (forward): −Y direction, reverse direction (backward): +Y direction, ascending direction (upward): +Z direction, descending direction (downward): −Z direction.

The propellers 110*a* and 110*b* receive outputs from the motors 111*a* and 111*b* to rotate. The rotation of the propellers 110*a* and 110*b* generates a propulsive force for taking off the flying body 100 from the starting point, moving and landing it at a destination. Further, the propellers 110*a* and 110*b* can rotate rightward, stop, and rotate leftward.

As shown in FIG. 1, the flying body 100 includes a mounting part and can mount an object 10*a* to be delivered. The object 10*a* to be mounted includes, for example, documents/products exchanged between companies/individuals, or food provided by restaurants, relief supplies, research equipment, etc., but are not limited thereto.

The propeller included in the flying body of the present disclosure has one or more wings. Any number of blades (rotors) (e.g. 1, 2, 3, 4, or more blades) may be used. Further, the shape of the blade can be any shape such as a flat shape, a curved shape, a twisted shape, a tapered shape, or a combination thereof. Further, the shape of the blade can be changed (for example, expansion/contraction, folding, bending, etc.). The blades may be symmetrical (having the same upper and lower surfaces) or asymmetric (having different shaped upper and lower surfaces). The blades can be formed into an air foil, wing, or geometry suitable for generating dynamic aerodynamic forces (e.g., lift, thrust) as the blades move through the air. The geometry of the blades can be appropriately selected to optimize the dynamic air characteristics of the blades, such as increasing lift and thrust and reducing drag.

Further, the propeller included in the flying body of the present disclosure may be a fixed pitch, a variable pitch, or a mixture of a fixed pitch and a variable pitch, without being limited thereto.

The motor 111*a* or 111*b* causes the rotation of the propeller 110*a* or 110*b*, and for example, a drive unit can include an electric motor, an engine, or the like. The blades are drivable by the motor 111*a* or 111*b* and rotate around the rotary shaft of the motor 111*a* or 111*b* (e.g., the major axis of the motor 111*a* or 111*b*).

The blades can all rotate in the same direction or can rotate independently. Some of the blades rotate in one direction and the other blades rotate in the other direction. The blades can all rotate at the same rotation speed or can rotate at different rotation speeds. The rotation speed can be automatically or manually determined based on the dimensions (e.g., size, weight) and control state (speed, moving direction, etc.) of the moving body.

The flying body 100 determines the rotation speed of each motor, or the flight angle according to the wind speed and the wind direction. Thereby, the flying body 100 can perform movements such as ascending, descending, accelerating, decelerating, and changing direction.

The flying body 100 may perform autonomous flight according to a route or rule set in advance or during flight, or flight by manipulation using a propo (proportional control system). For example, in the delivery business, it is desirable to autonomously fly from a facility that is the origin of delivery to a facility or residence that is the destination of delivery.

The mounting space 50 provided in the flying body 100 of the present disclosure is provided inside or outside the flying body 100, and the object 10*a* may be mounted so as to tilt according to the inclination of the flying body 100. Further, it may be connected so as to be independently displaceable by using a means such as a gimbal structure having one or more axes and mounted so as not to be interfered with by the inclination of the flying body 100.

Regarding the delivery of the object using the flying body, an example of delivery from a business operator to a private home is shown below.

(1) A person engaged in the business of performing delivery (for example, transport companies, retailers, convenience stores, fast food stores, etc.) loads the object into the flying body.

(2) The flying body takes off toward the delivery destination.

(3) The flying body arrives at the delivery destination.

(4) The flying body lands at a predetermined place or hovers at a predetermined place.

(5) The load is discharged, and the object is unloaded at a predetermined place.

(6) The flying body rises again and starts moving.

(7) The, in the case of performing delivery, it is directed to the next delivery address, and the load is discharged in the same way.

(8) After the delivery is completed, the flying body returns to the designated facility.

(9) Perform necessary items such as battery replacement, charging, and maintenance for the flying body.

For existing unmanned aerial vehicles for home delivery, in addition to the flying body that loads and unloads the object from below the aircraft, many flight vehicles have been developed that are equipped with a case for mounting an object and can be opened and closed from the side of the airframe to load and unload the object. In an airframe adopting this method, unlike the mounting of an object under the airframe, the user is not required to perform complicated operations.

However, when home delivery by unmanned aerial vehicles becomes widespread in the future, the load will be picked up by the general public living in private homes rather than business operators. In that case, the individual performs the operation of opening the case of the flight vehicle, taking out the load, and closing the lid of the case from the aircraft landing at the private house.

It is assumed that many risks are involved when the operation is left to an individual. For example, there may be mentioned failure or accident caused by forgetting to close the case or carelessly touching various parts of the aircraft, injuries, and mischief of infants and animals, modification or destruction by a malicious individual, an accident involving the flight at the time of restarting. When there is any damage to the flight vehicle, it is possible to narrow the point of occurrence by tracing the delivery route, but it is desirable to reduce the possibility of such risk occurring.

As a means of not having to approach or touch the flying body, there is a method in which a user who receives a load at a private house loads the luggage at the bottom part of the flying body and separates the luggage at the delivery destination. In this method, in addition to unloading the luggage after landing at the delivery destination, the business operator connects the luggage to the flying body from the bottom part of the flying body and unloads the luggage from the sky without landing at the delivery destination. However, compared to the method of mounting the luggage on the case from the side, the operation of the business operator becomes troublesome or complicated.

Figure 2:
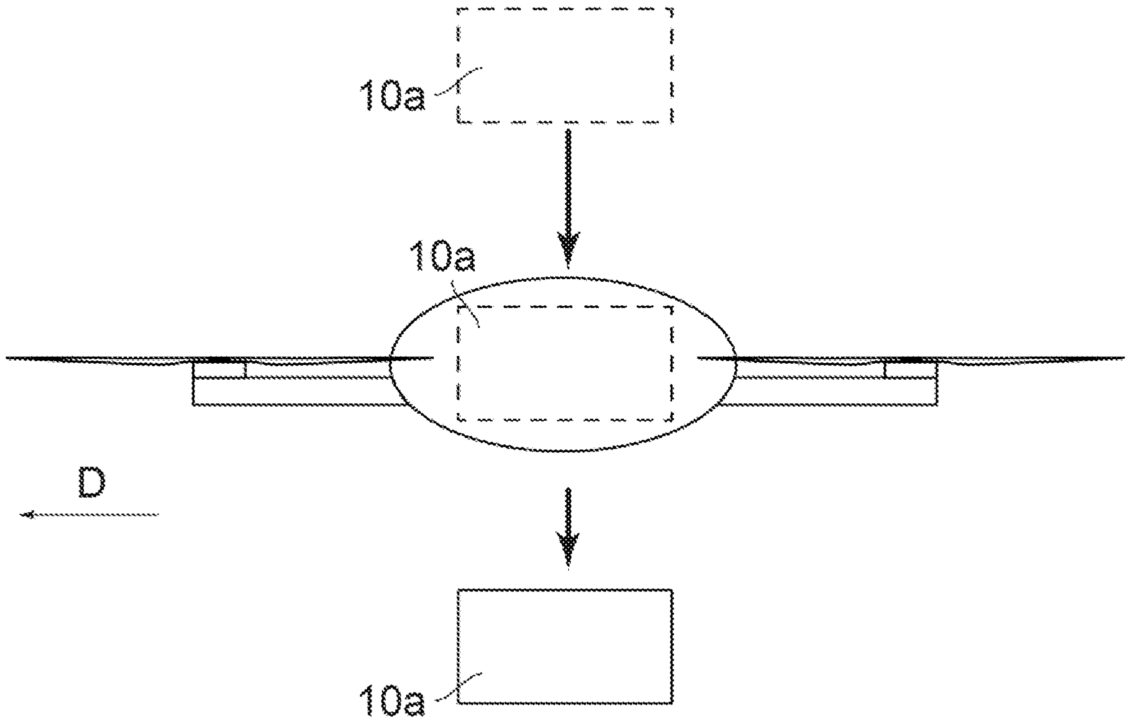
FIG. 2 is another side view of an object loading/unloading method according to the present disclosure of FIG. 1.
Figure 3:
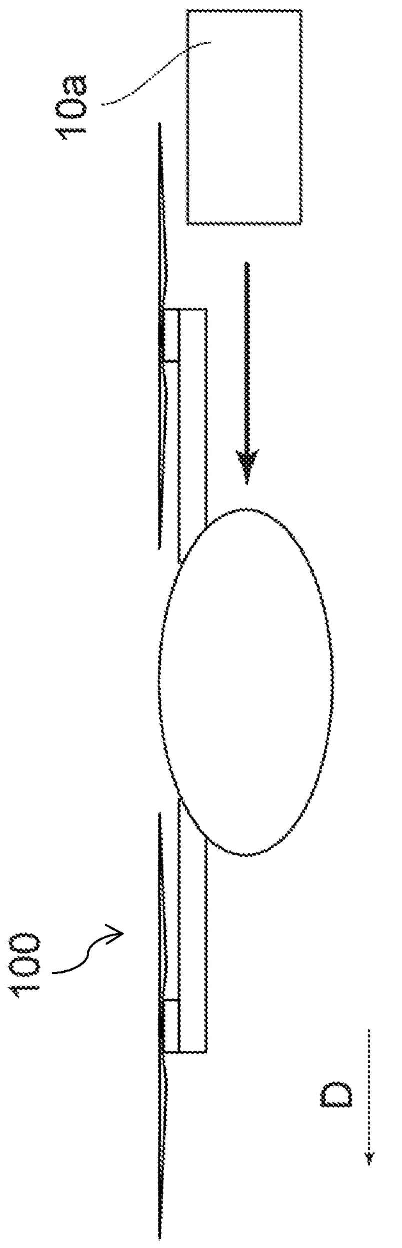
FIG. 3 is a conceptual diagram of an object loading/unloading method according to the present disclosure as viewed from the side.
Figure 4:
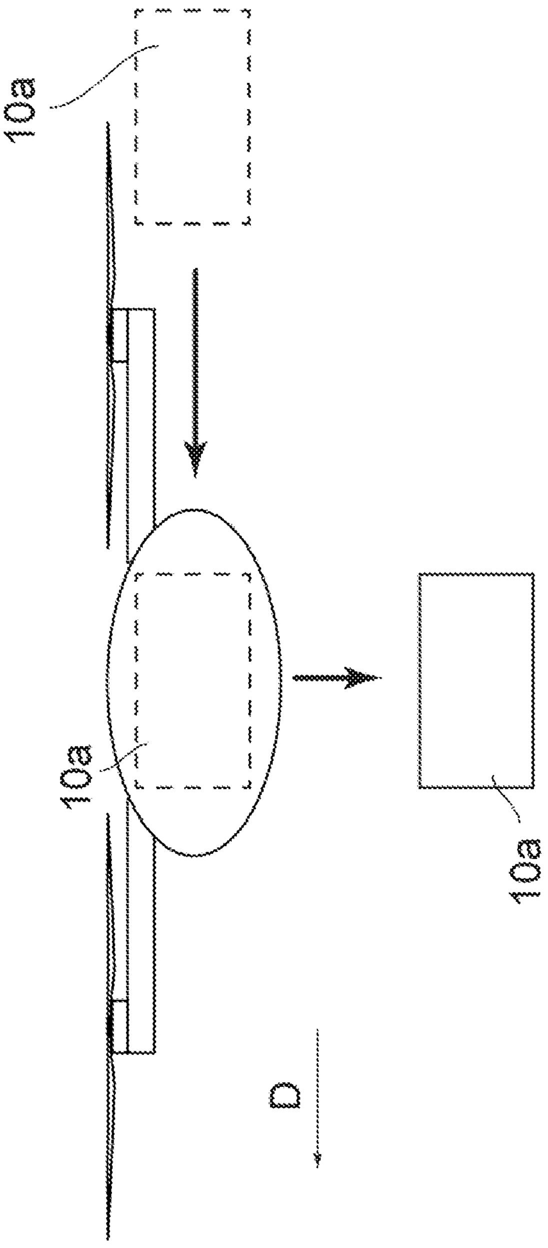
FIG. 4 is another side view of the object loading/unloading method of FIG. 3.

Therefore, in the luggage loading system in the present disclosure, for example, as shown in FIG. 2, by separately providing an opening for loading luggage on the aircraft and an opening for unloading luggage from the aircraft, the luggage loading system is provided separately, thereby improving safety at the time of unloading while maintaining the convenience of loading and unloading.

Figure 7:
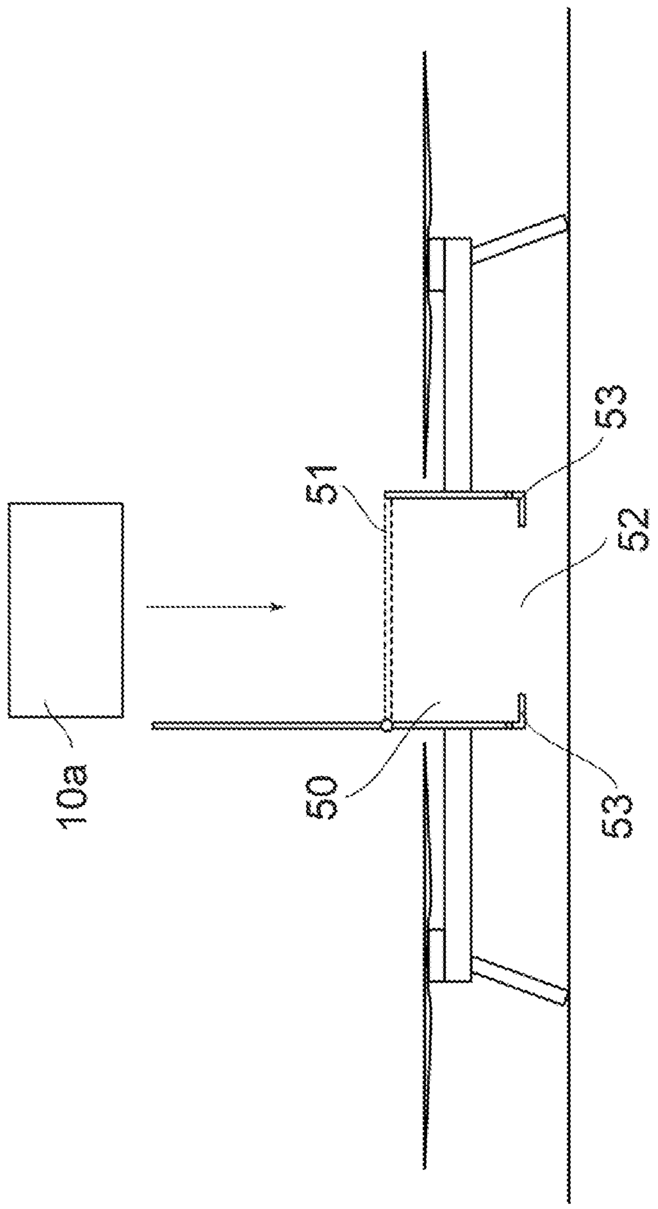
FIG. 7 is a diagram of an object loading/unloading method according to the present disclosure at the time of introducing the object from above.

As shown in FIG. 7, the luggage can be loaded on the airframe by dropping it from the upper part of the fuselage. Therefore, it is not necessary to manually attach the luggage to the lower part of the airframe, and it is possible to minimize complicated movements and contact with the aircraft.

Further, even when the cover is attached in consideration of waterproof/dustproof and aerodynamics, basically only the operation of opening/closing the upper lid is required.

Example 1

As shown in FIGS. 1 and 2, the object 10*a* is mounted from above the airframe, and the object 10*a* can be taken out from below the airframe.

In FIG. 7, the object 10*a* loaded from the loading port 51 provided above the airframe is stopped at a predetermined position of the aircraft by the discharge mechanism 53. At this time, when the fixing means in the X and Y directions are provided together with the fixing in the Z direction, it can be mounted so as not to slip in the mounting portion even if the size of the object 10*a* to be mounted is smaller than the maximum storage size of the mounting part of the airframe. When the discharge mechanism (or discharge element) 53 stops holding the object 10*a* or causes the object 10*a* to be lowered to the landing point, the object 10*a* is discharged from the flying body 100.

Further, the loading port 51 and the take-out port 52 for mounting the object 10*a* may be provided with a lid or the like from the viewpoint of drip-proof, aerodynamics, and prevention of the object 10*a* from falling due to the behavior of the airframe. It is preferable that the lid is provided with a lock mechanism (lock pin or the like), a mechanism (or element) that does not open unless a predetermined force is applied (magnet or the like), a mechanism (or element) that allows the presence or absence of a lock to be visually confirmed, and the like. The locking mechanism (or locking element) from the viewpoint of security will be described later.

Figure 8:
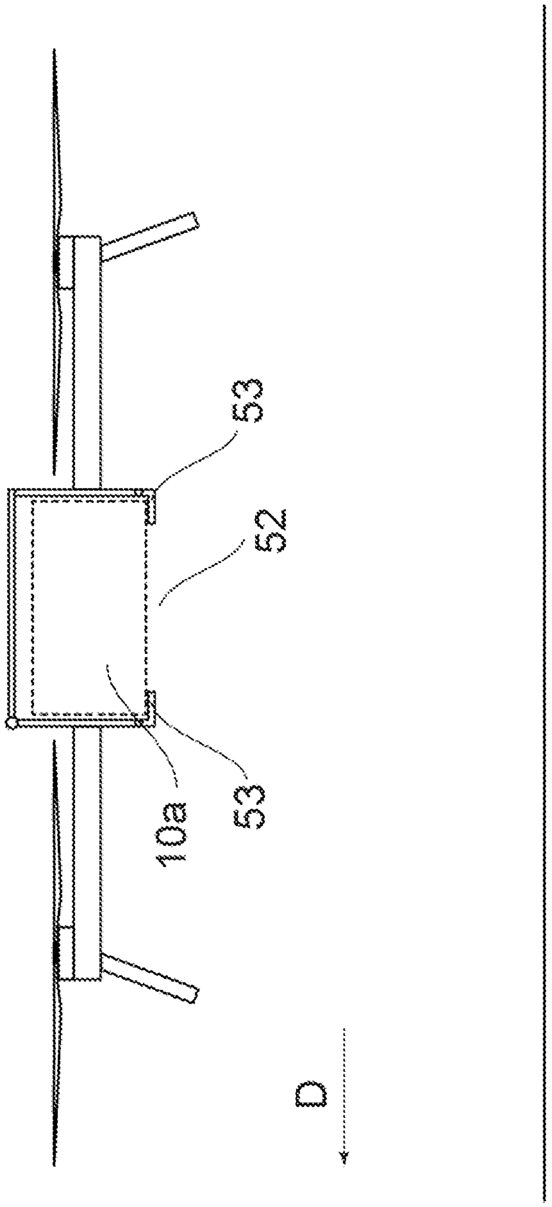
FIG. 8 is a flight diagram of the object loading/unloading method of FIG. 7.

As shown in FIG. 8, the flying body 100 equipped with the object 10*a* flies to the delivery destination. The flying body 100 reaches a predetermined position of the delivery destination of the object 10*a* by a flight through human operation or a flight including autonomous control.

Figure 9:
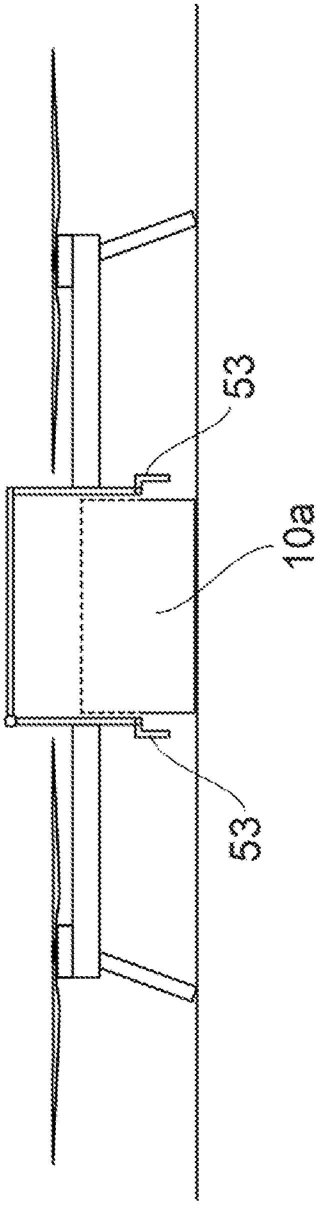
FIG. 9 is a diagram of an object loading/unloading method at the time of discharging the object.
Figure 10:
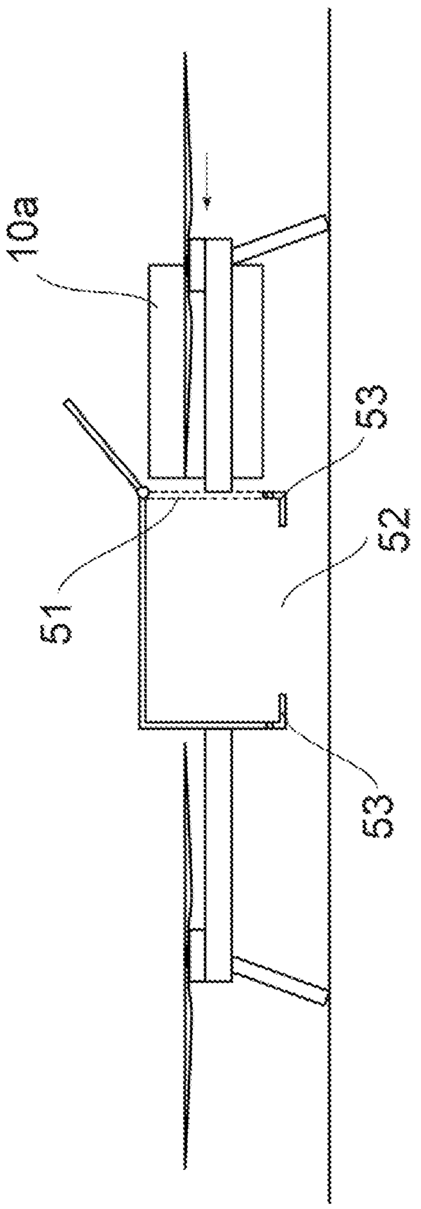
FIG. 10 is a diagram of an object loading/unloading method according to the present disclosure at the time of loading an object from the side.
Figure 11:
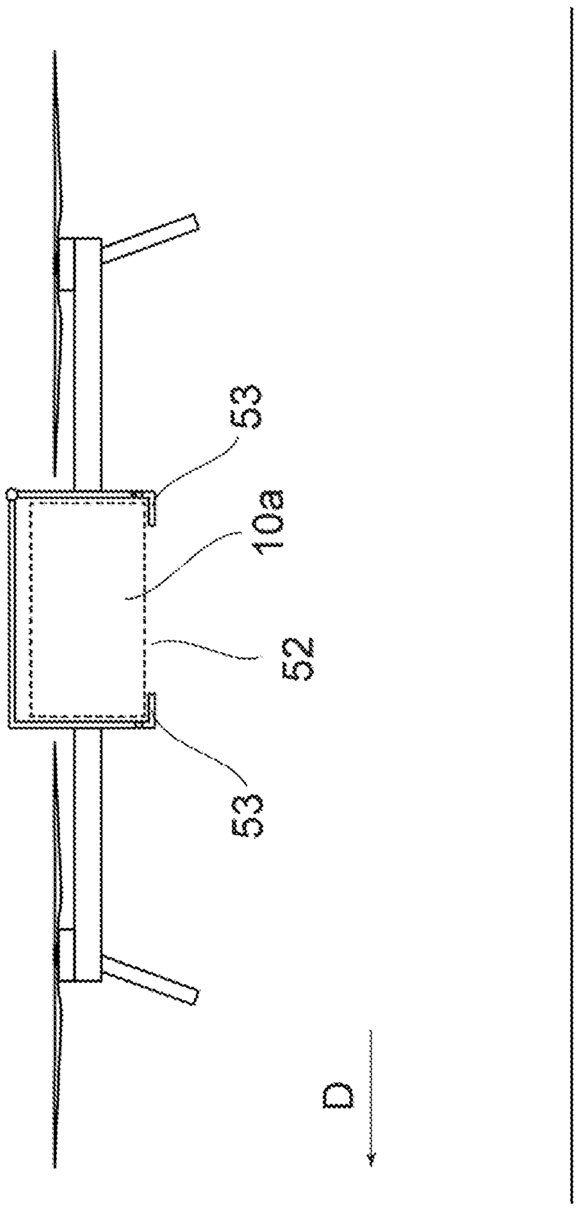
FIG. 11 is a diagram of an object loading/unloading method during flight.

As shown in FIG. 9, when the flying body 100 is in a state suitable for discharging the object 10*a* such as landing and hovering at a predetermined place, the object 10*a* can be discharged from the lower part of the airframe by the discharge element 53.

After taking out the object 10*a* in a predetermined place, the flying body 100 can leave the place and head for the next destination. Further, the user who receives the object 10*a* can acquire the object 10*a* delivered to a predetermined place. Since the receiving user does not need to come into contact with the airframe of the flying body 100, it is possible to operate with high safety for both the airframe side and the user side.

Example 2

In the details of the first embodiment pattern 2 according to the present disclosure, since the components overlapping with the pattern 1 perform the same or the similar operation, the description thereof will be omitted again.

As shown in FIGS. 3 to 4 and 10 to 12, the object 10*a* is mounted from the side of the airframe, and the object 10*a* can be taken out from below the airframe.

Figure 12:
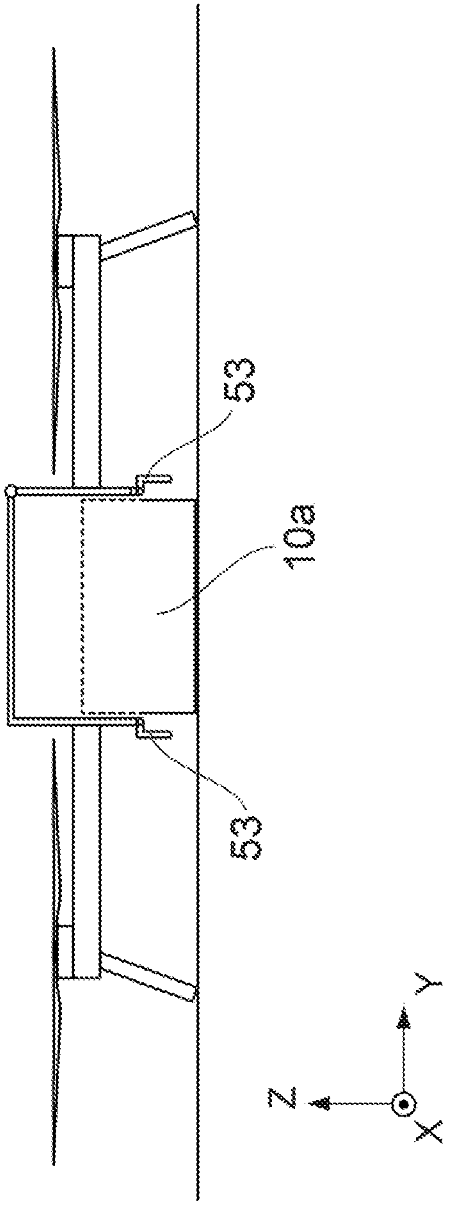
FIG. 12 is a diagram of the object loading/unloading method of FIG. 10 at the time of discharging the object.
Figure 13:
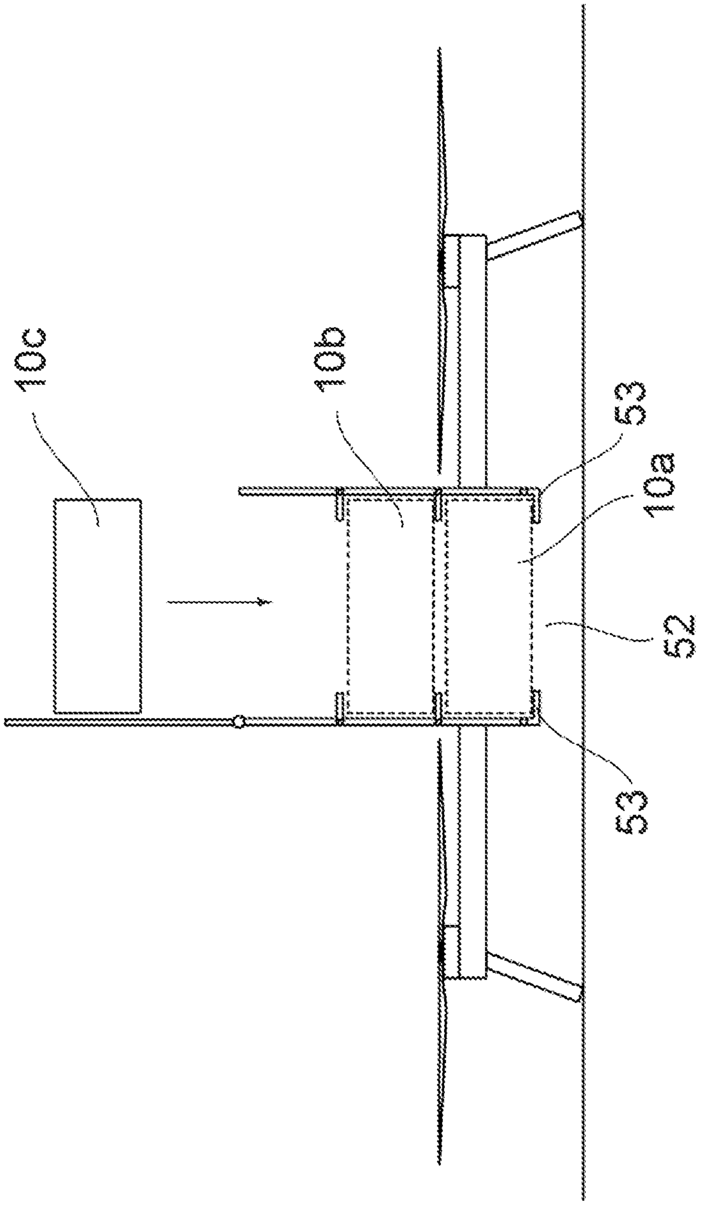
FIG. 13 is a diagram at the time of loading an object from above when objects of an object loading/unloading method according to the present disclosure are mounted in a plurality of numbers.
Figure 14:
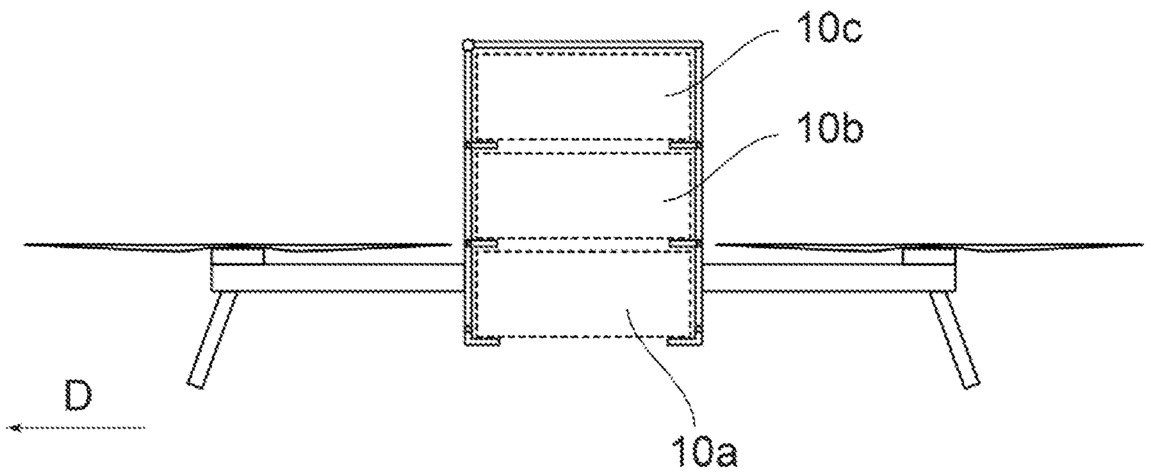
FIG. 14 is a flight diagram of the object loading/unloading method of FIG. 13.
Figure 15:
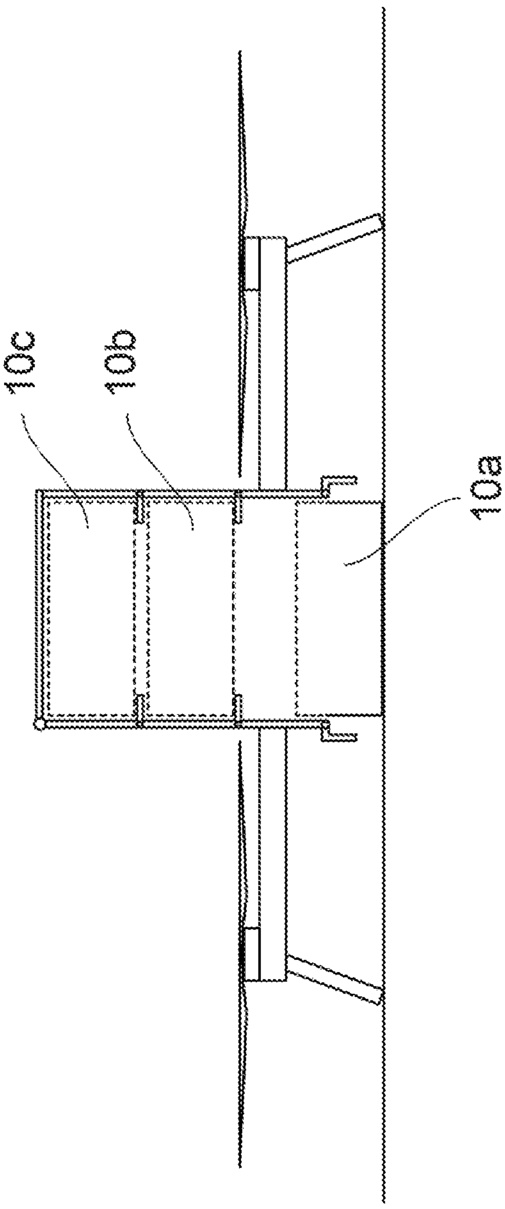
FIG. 15 is a diagram of the object loading/unloading method of FIG. 13 at the time of discharging the object.
Figure 16:
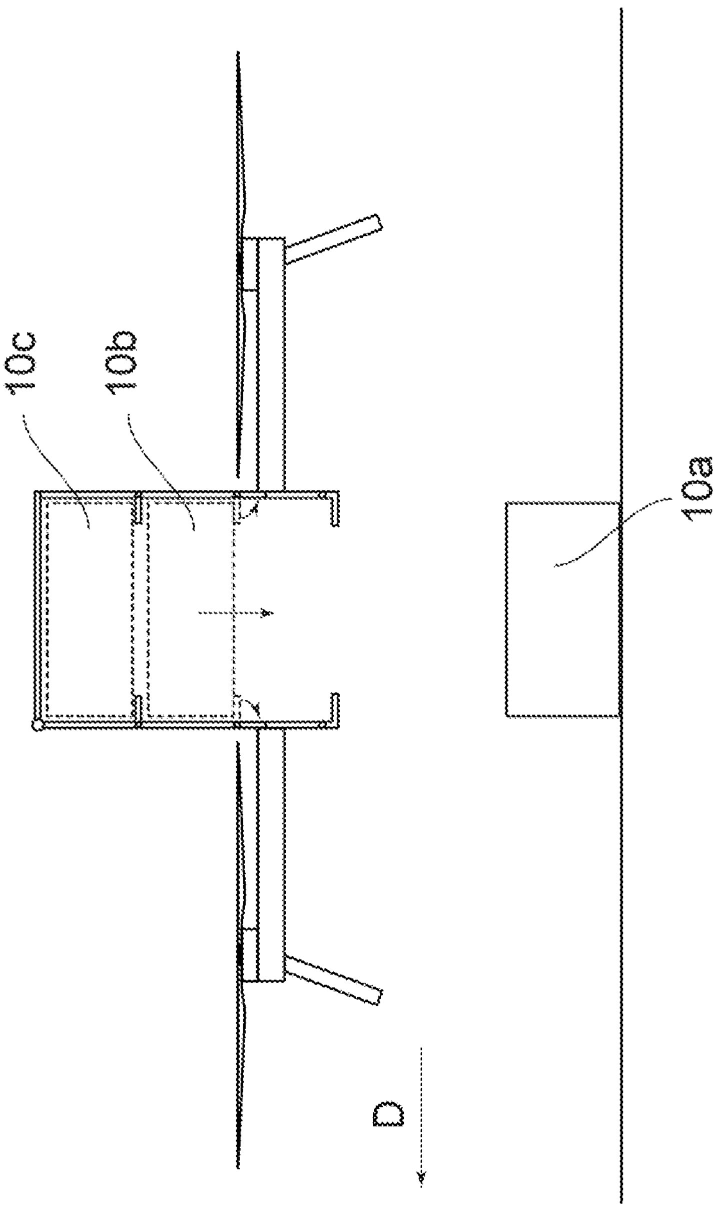
FIG. 16 is a side view of an object loading/unloading method according to the present disclosure.
Figure 17:
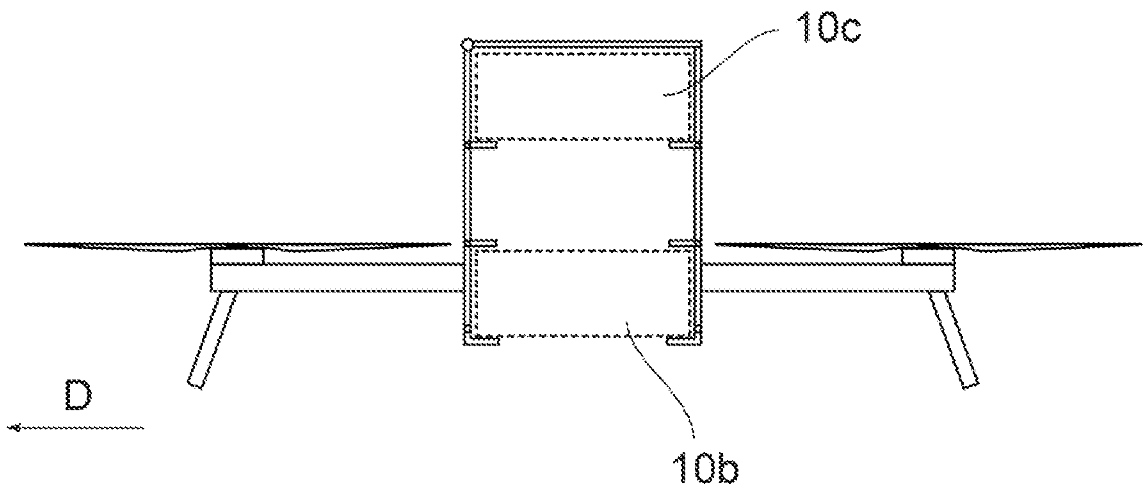
FIG. 17 is a side view of an object loading/unloading method according to the present disclosure.
Figure 18:
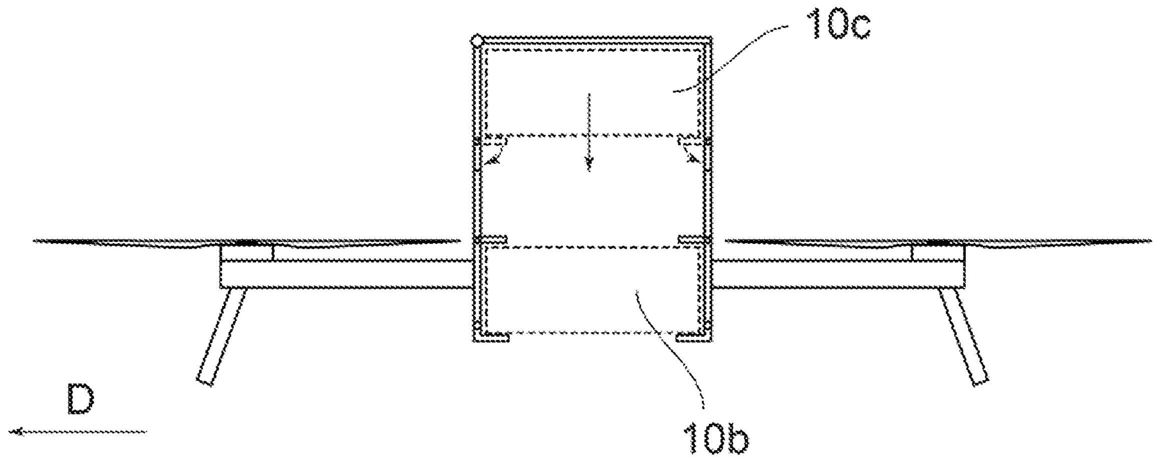
FIG. 18 is a side view of an object loading/unloading method according to the present disclosure.
Figure 19:
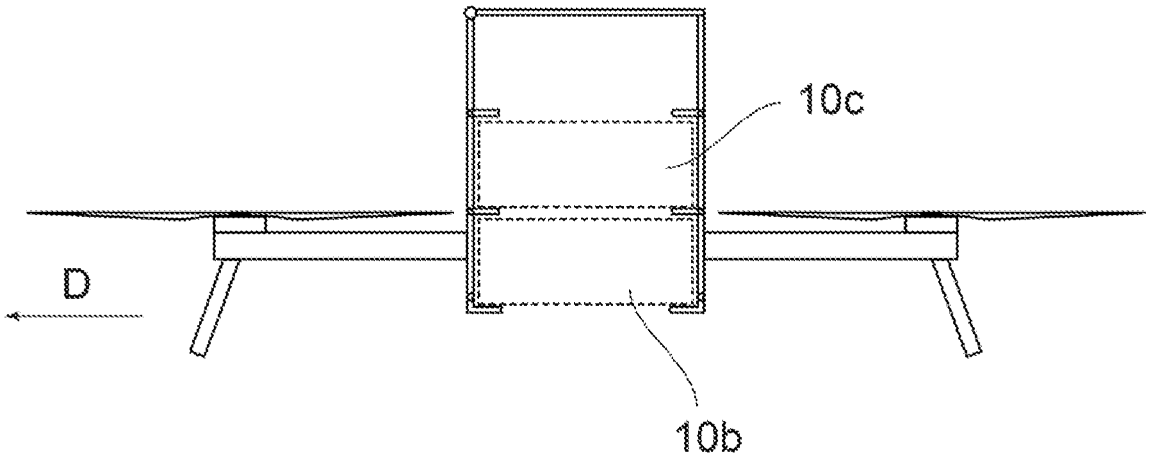
FIG. 19 is a diagram of the object loading/unloading method of FIG. 13 at the time of discharging the object.
Figure 20:
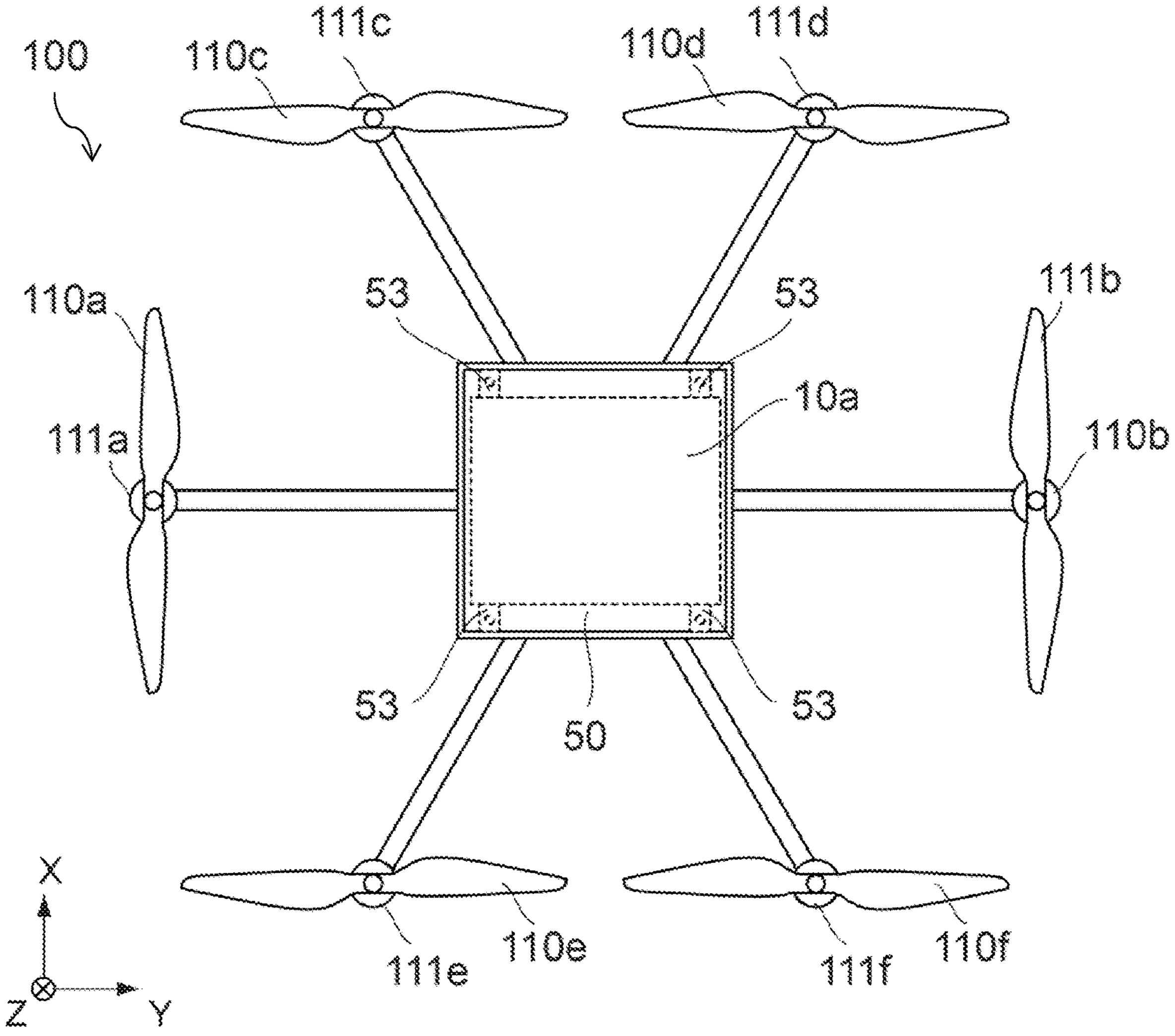
FIG. 20 is a top view of an object discharge mechanism of an object loading/unloading method according to the present disclosure.
Figure 21:
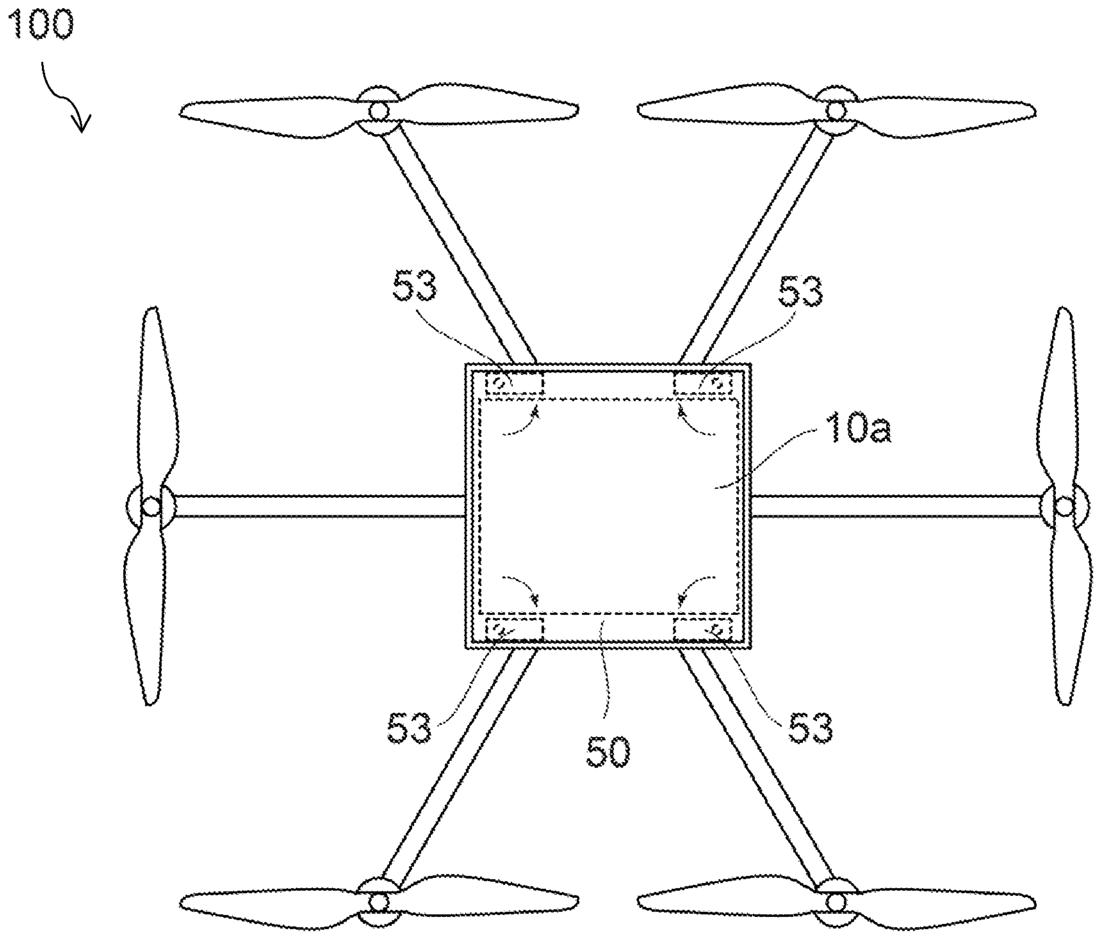
FIG. 21 is an operation example of the object discharge mechanism of FIG. 20 at the time of discharge.

The discharge element 53 of the flying body 100 for discharging the object 10*a* includes an opening/closing mechanism shown in FIGS. 9 and 12 and a rotation mechanism shown in FIGS. 20 to 21 as a simple mechanism. Such a discharge mechanism can play a role of both holding and discharging the object 10*a*, and the held object 10*a* is freely dropped by the operation and discharged from the flying body 100.

When the flying body 100 is landing, the impact on the object 10*a* due to free fall is slight, but when the object 10*a* is discharged in the sky, it is preferable that the object 10*a* is provided with a mechanism for attenuating the descent speed of a parachute or the like in advance. For example, when delivering relief supplies or installing survey equipment in the mountains where it is difficult for people to enter or land the flying body 100, it is necessary to drop the object 10*a* from the sky.

Besides, by sending out by gears, using robot arms, slopes, etc., it is possible to discharge while suppressing the impact on the object 10*a* such as free fall. For example, in the slope, the lid of the mounting space 50 may also be used.

Figure 5:
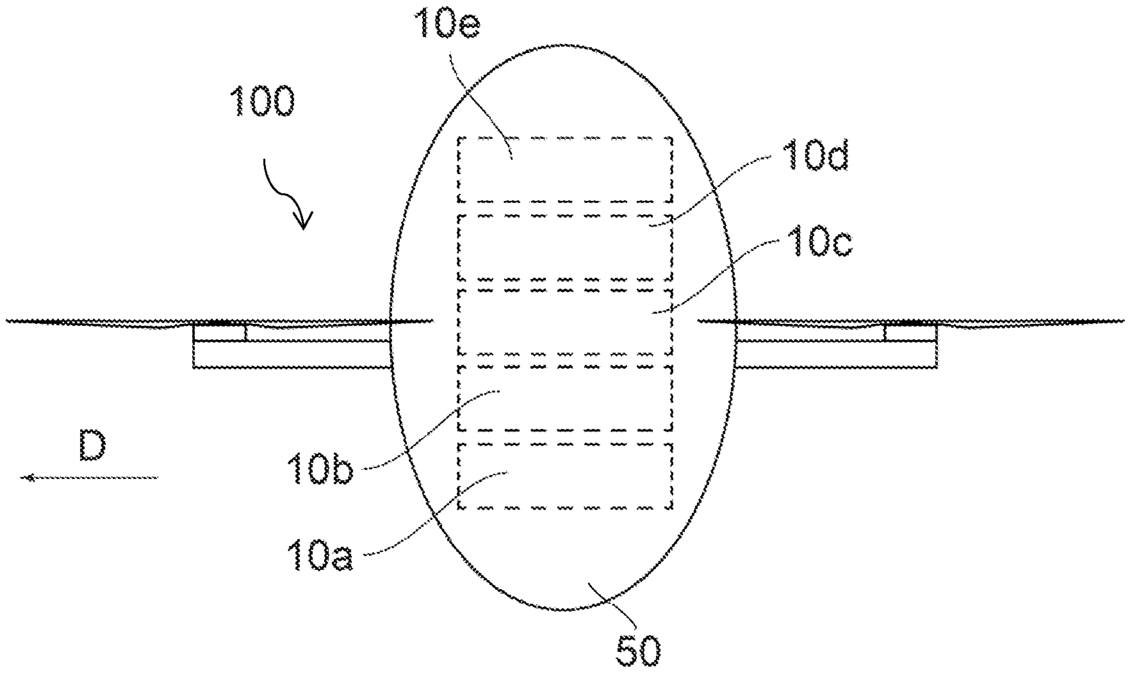
FIG. 5 is a conceptual diagram when plural objects are mounted on a flying body with an object loading/unloading method according to the present disclosure.
Figure 6:
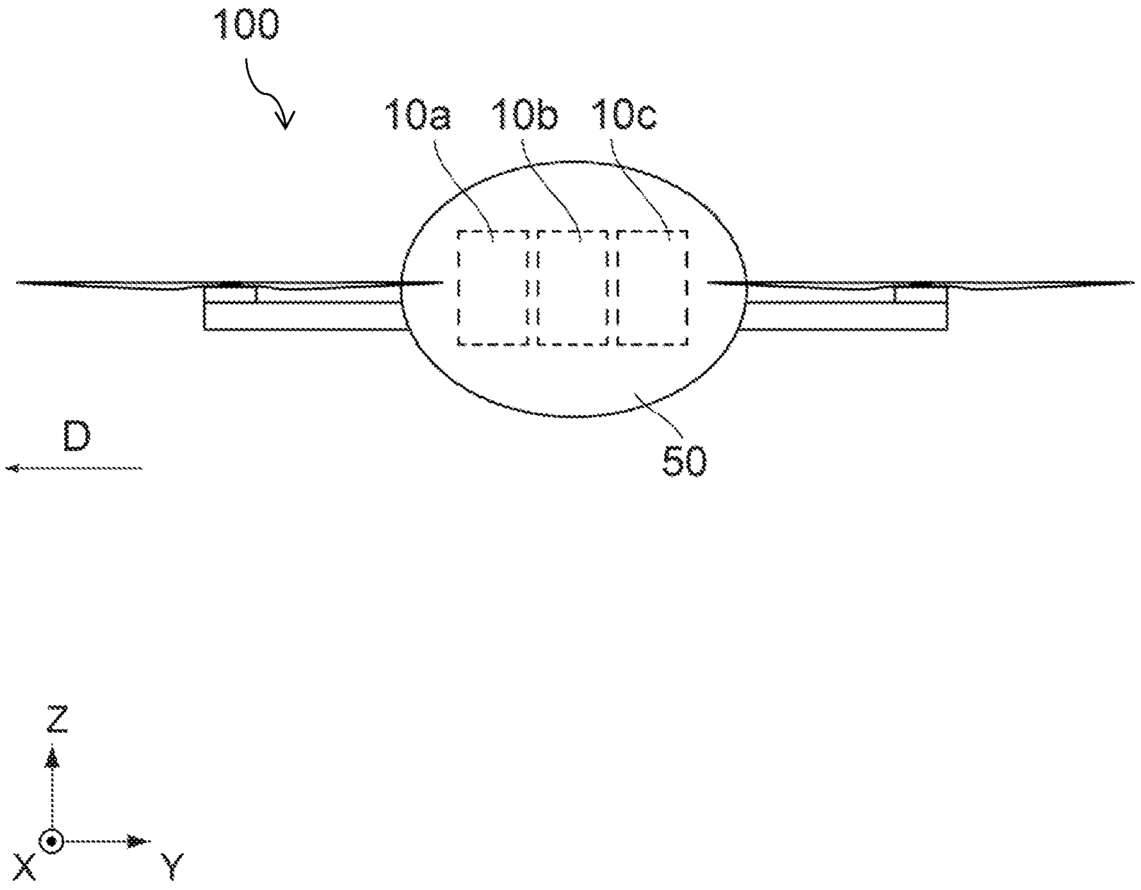
FIG. 6 is another conceptual diagram when plural objects are mounted on a flying body with an object loading/unloading method according to the present disclosure.

Further, the flying body 100 may be loaded with a plurality of objects, e.g., 10*a*, 10*b*, 10*c*, 10*d*, and 10*e*, for delivery destinations as shown in FIGS. 5 to 6. The objects 10*a* to 10*e* are mounted from above the airframe. When the method of unloading from the bottom part of the airframe is adopted, the objects 10*a* to 10*e* of multiple destinations are placed. For smooth unloading, as shown in FIGS. 13 to 19, it is preferable to load from the object 10*a* to be lowered first so that it is first-in first-out. However, the mounting order of the objects 10*a* to 10*e* is not limited thereto.

Further, in the case of the flying body 100 having the loading port 51 on the lower side, the object 10*a* placed on the landing surface can be recovered by the flying body 100. If the object 10*a* recovered from the lower side is discharged from the take-out ports 52 provided on the upper side or the left and right sides, it is possible to perform first-in first-out in the direction opposite to that in FIGS. 13 to 15.

Figure 24:
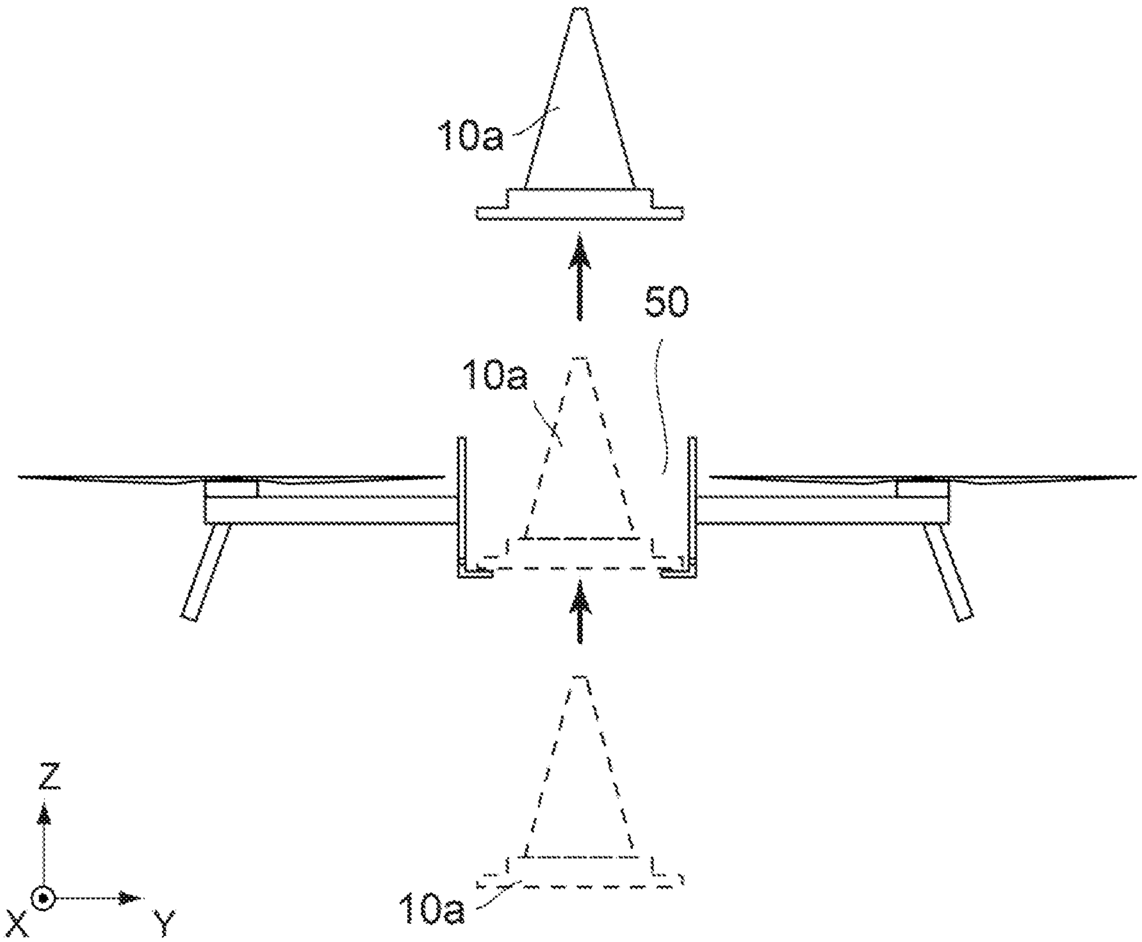
FIG. 24 is a side view when an object is mounted from below on a moving body with an object loading/unloading method according to the present disclosure.
Figure 25:
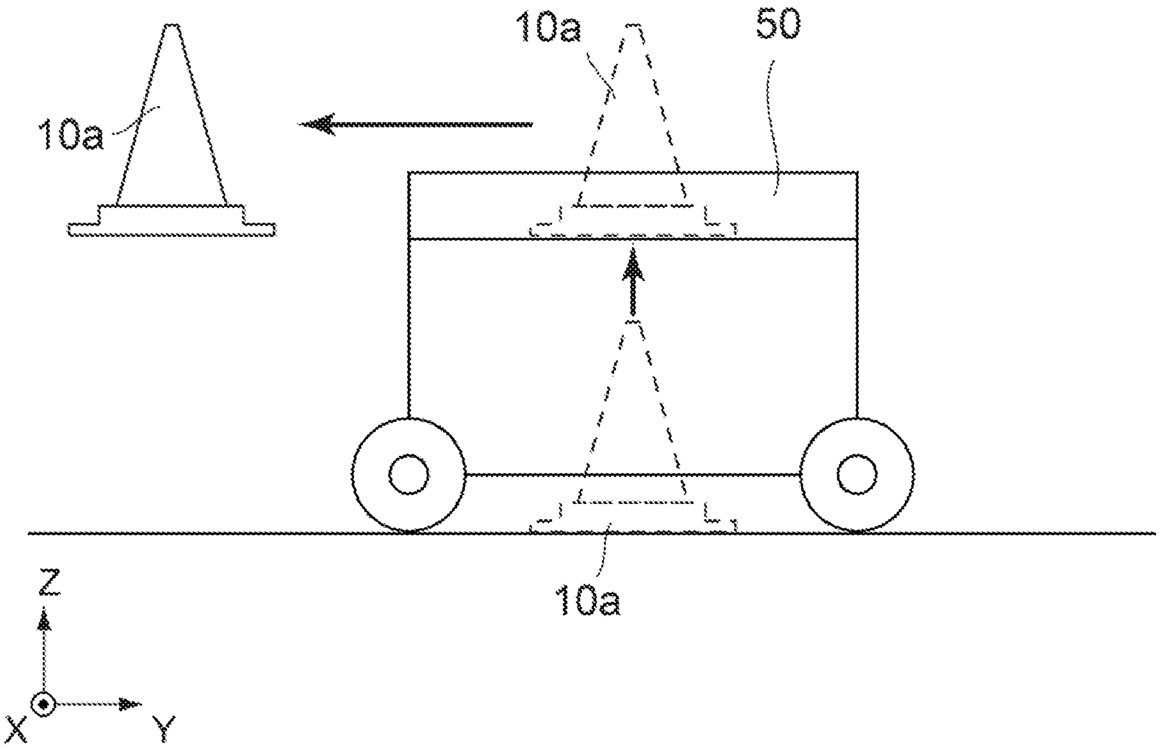
FIG. 25 is a side view when an object is mounted from below on a moving body with an object loading/unloading method according to the present disclosure.

For example, as shown in FIGS. 24 to 25, the object 10*a* (a road cone is illustrated in the figure) placed on the ground is recovered by the flying body 100 or the moving body 200 according to the embodiment of the present disclosure and can be discharged from above or from the side. In this case, first-in first-out is realized, and the object 10*a* is easily taken out.

In the operation of the flying body 100, it is desirable to have a locking mechanism from the viewpoint of security in addition to the locking mechanism from the viewpoint of drip-proof, aerodynamics, and prevention of falling of the object.

When the discharge element 53 provided in the flying body 100 can perform discharge by communicating with a predetermined device at the landing point or the discharge point of the object and receiving the discharge execution signal. It is possible to prevent accidents such as the loading being discharged at the wrong point or being ejected when the object is not ready to be accepted.

Figure 26:
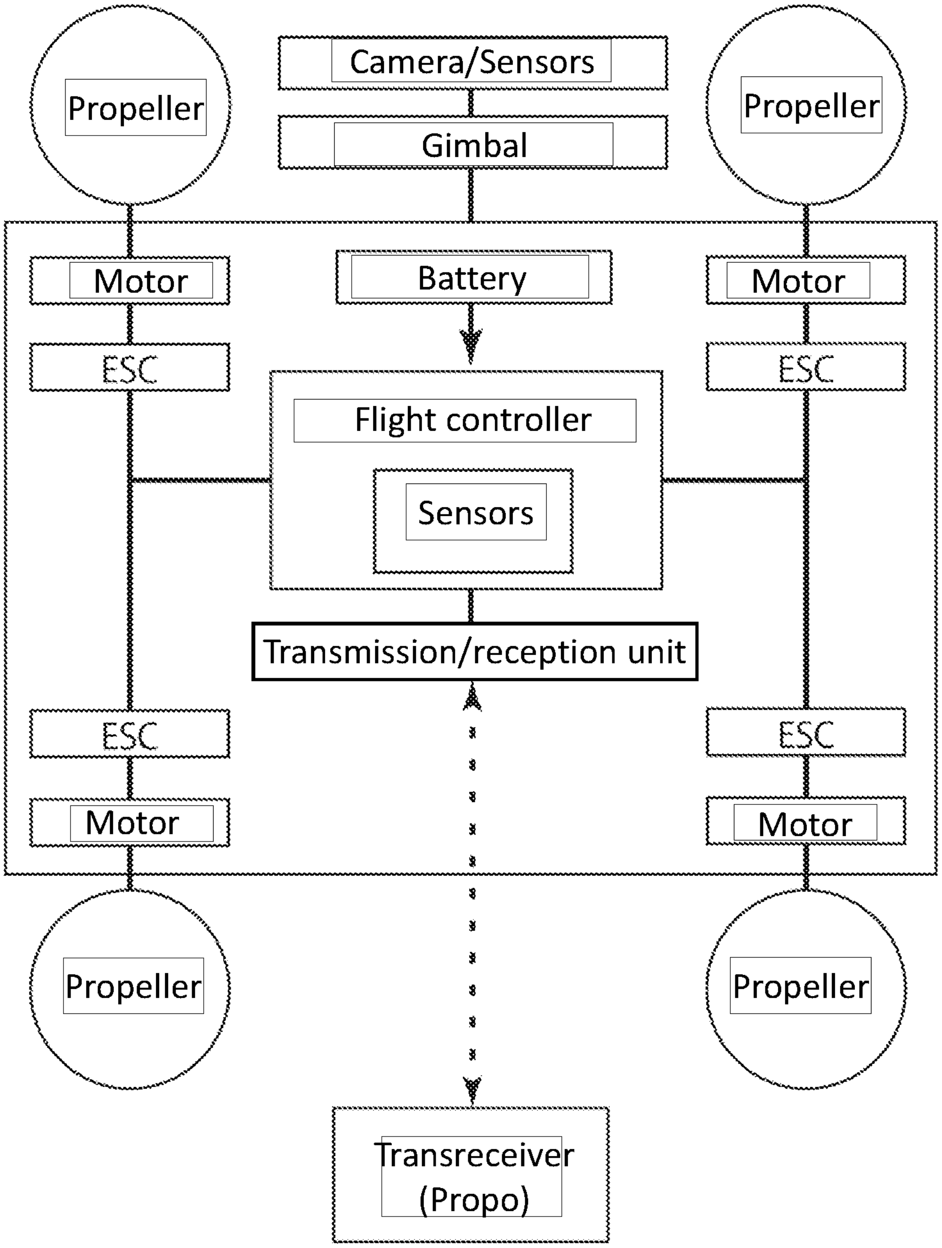
FIG. 26 is a functional block diagram of the flying body of FIG. 1.

The above-described flying body has a functional block as shown in FIG. 26. In addition, the functional block of FIG. 26 is a minimum reference structure. A flight controller is a so-called processing device. The processing device may have one or more processors, such as a programmable processor (e.g., a central processing unit (CPU)). The processing device has a memory (not shown) and it is possible to access the memory. The memory stores logic, codes, and/or program instructions that can be executed by the flight controller to perform one or more steps. The memory may include, for example, a separable medium such as an SD card or random access memory (RAM) or an external storage device. Data obtained from cameras and sensors may be transmitted directly to the memory and stored. For example, still image. dynamic image data taken by a camera or the like is recorded in a built-in memory or an external memory.

The processing device includes a control module configured to control the state of the rotorcraft. For example, the control module may control a propulsion element (motor and the like) in order to adjust the spatial arrangement, velocity, and/or acceleration of the aircraft having six degrees of freedom (translational motions x, y, and z, and rotational motions θx, θy, and θz). The control module can control one or more of the states of a mounted part and sensors.

The processing device can communicate with a transmission/reception unit configured to send and/or receive data from one or more external devices (e.g., a terminal, display device, or other remote controller). The transmission/reception unit can use any suitable communication means such as wired or wireless communication. For example, the transmission/reception unit can use one or more of a local area network (LAN), a wide area network (WAN), infrared, wireless, WiFi, point-to-point (P2P) network, telecommunication network, cloud communication, and the like. The transmission/reception unit can transmit and/or receive one or more of the data acquired by sensors, process results generated by the processing device, predetermined control data, user command from a terminal or a remote controller, and the like.

Sensors according to the present embodiment may include inertial sensors (acceleration sensors, gyro sensors), GPS sensors, proximity sensors (e.g., LiDAR), or vision/image sensors (e.g., cameras).

Second Embodiment

In the details of the second embodiment according to the present disclosure, the components overlapping with the first embodiment perform the same operation, and thus the description thereof will be omitted again.

Figure 22:
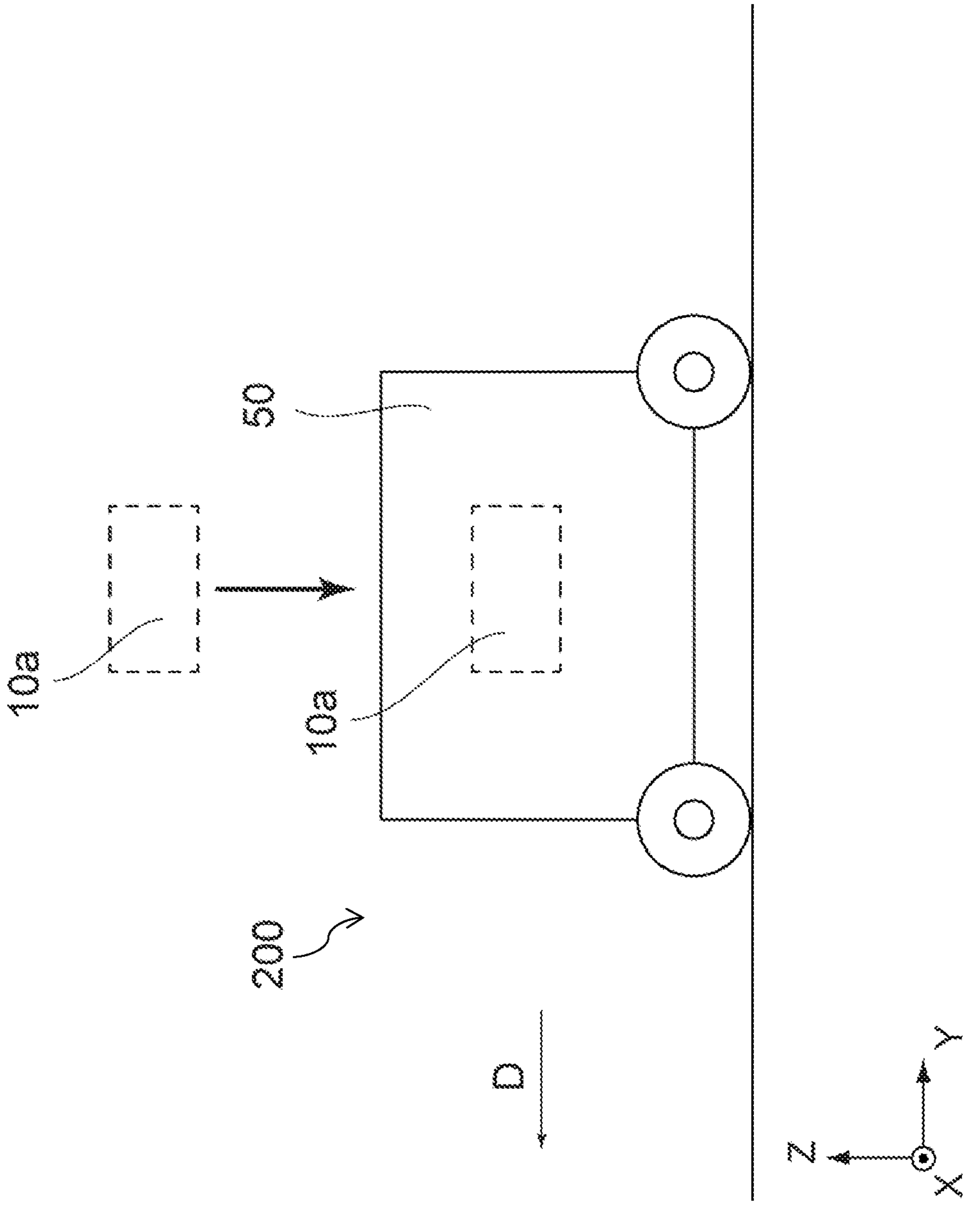
FIG. 22 is a conceptual diagram of a moving body with an object loading/unloading method according to the present disclosure, as viewed from the side.
Figure 23:
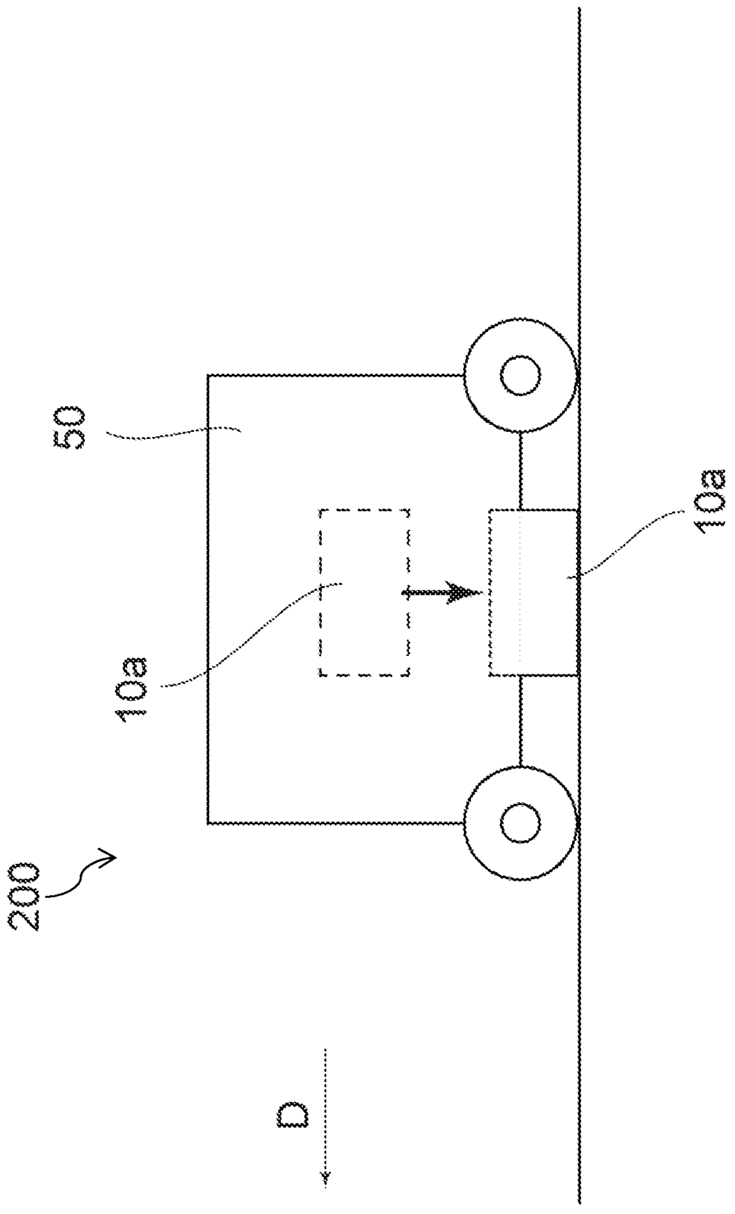
FIG. 23 is a diagram of the moving body in FIG. 22 at the time of discharging the object.

As shown in FIGS. 22 to 23, a moving body 200 according to the embodiment of the present disclosure includes a mounting space 50 for loading an object 10*a*. The mounting space 50 includes a mounting port for mounting the object 10*a* and a take-out port for taking out the object 10*a*. The loading port and the take-out port are provided at least partially at different positions.

The moving body 200 can mount an object such as an automated traveling robot that is already well known and has a function of enabling movement to a target point.

As described above, according to the embodiment of the present disclosure, since the loading port and the taking-out port of the luggage are different, it will be possible to efficiently load and unload luggage. The loading port may be any of the front side, the rear side, the right side, the left side, the upper side, and the lower side. Especially in the case of the upper side, it is easy to load because it is only necessary to lower the luggage. If it is difficult to load from above, for example, it may be loaded from the horizontal direction such as front side, rear side, right side, and left side. Also, if the take-out part of the luggage is different from the loading port, it may be front side, rear side, right side, left side, upper side, or lower side. In this case, it may be taken out from the lower side for automatic loading and unloading of luggage. For example, when the luggage is manually taken out, it may be taken out from the horizontal direction such as front side, rear side, right side, and left side. Further, if the weight is not heavy, it may be taken out from the upper side.

Furthermore, if necessary, there may be one or more loading ports and take-out parts. Thereby, it is possible to select an easy-to-remove take-out port and then take out the luggage, in especially, depending on the condition of the landing place.

As described above, according to the present disclosure, an object such as a luggage is loaded into the mounting space from the loading port along the first direction (the direction in which the load is loaded when the load is loaded in the loading port). After that, the flying body is flown to move to the destination, and at the destination, the luggage is taken out from the take-out port along the second direction (the direction in which the luggage loaded in the mounting space is taken out from the take-out port). In this case, the loading port and the take-out port are at least partially different. Therefore, the loading direction and the taking-out direction of the luggage can be different. According to such a configuration, it is possible to smoothly load and unload luggage even if the surrounding environment at the time of loading and unloading is different.

Also, if loading and unloading from two directions are possible in this way, the use of one for loading and the other for unloading can be flexibly adapted to the environment of the departure and arrival locations of flying bodies, without having to fix the use of one for loading and the other for unloading.

The above-described embodiments are merely examples for facilitating the understanding of the present disclosure and are not intended to limit the present disclosure. The present disclosure can be modified and improved without departing from the gist thereof, and it goes without saying that the equivalents are included in the present disclosure.

DESCRIPTION OF REFERENCE NUMERALS

10*a*-10*e*: object
50: mounting space
51: loading port
52: take-out port
53: discharge mechanism
100: flight vehicle/flying body
110*a*-110*f*: propeller
111*a*-111*f*: motor
200: moving body

The invention claimed is:

1. A flying body comprising:

a plurality of mounting spaces, each mounting space of the plurality of mounting spaces configured to independently mount an object;

a loading port for loading an object into the plurality of mounting spaces;

a take-out port for taking out the object loaded in the plurality of mounting spaces; and a landing gear for supporting the flying body, wherein the loading port and the take-out port are provided at least partially at different positions, wherein the loading port is provided above the mounting spaces, wherein the take-out port is provided below the mounting spaces, wherein the take-out port includes a discharge element to hold and release the object, wherein a bottom surface of the landing gear is located at a lower position than the discharge element, and wherein the plurality of mounting spaces are arranged as distinct spaces in a series in a vertical direction of the flying body.

* * * * *